United States Patent [19]

Hock

[11] 4,232,873
[45] Nov. 11, 1980

[54] RING SPRING FOR COMPOSITE MACHINERY SEALS AND METHOD OF MANUFACTURING SAME

[76] Inventor: Jules M. Hock, 16056 Arbela Dr., Whittier, Calif. 90603

[21] Appl. No.: 19,848

[22] Filed: Mar. 12, 1979

[51] Int. Cl.³ .......................... F16J 15/32; F16J 15/10
[52] U.S. Cl. .................................. 277/206 A; 277/9; 277/152; 277/165
[58] Field of Search ................... 277/92, 95, 152, 165, 277/205, 206 R, 206 A, 1, 9; 285/DIG. 19; 251/DIG. 1

[56] References Cited

U.S. PATENT DOCUMENTS

| | | |
|---|---|---|
| 2,841,429 | 7/1958 | McCuistión ................ 251/DIG. 1 |
| 3,272,519 | 9/1966 | Voitik ........................ 277/206 A X |
| 3,542,380 | 11/1970 | Klein ......................... 277/206 A X |
| 3,622,168 | 11/1971 | Woodling ................ 277/206 A X |
| 3,851,888 | 12/1974 | Limpson ............................. 277/206 |
| 4,134,595 | 1/1979 | Melville ................................. 277/9 |

FOREIGN PATENT DOCUMENTS 2355198  5/1975  Fed. Rep. of Germany ...... 277/207 A

*Primary Examiner*—Robert S. Ward, Jr.
*Attorney, Agent, or Firm*—Philip M. Hinderstein

[57] ABSTRACT

An elastomeric resilient ring spring for use in an annular elastomeric boot generally of a U-cup configuration having an exposed annular groove which is generally x-shaped, the ring spring being generally +-shaped including four lobes, first and second opposed lobes extending parallel to the plane of the ring spring and third and fourth opposed lobes extending perpendicular to the plane of the ring spring. The dimensions of the ring spring are approximately the same as those of the groove whereby rotation of the ring spring about its ring axis through an angle of 45° permits mating of the ring spring into the groove in the boot. Such a ring spring may be molded in a conventional mold in a far simpler manner than conventional x-shaped ring springs.

5 Claims, 7 Drawing Figures

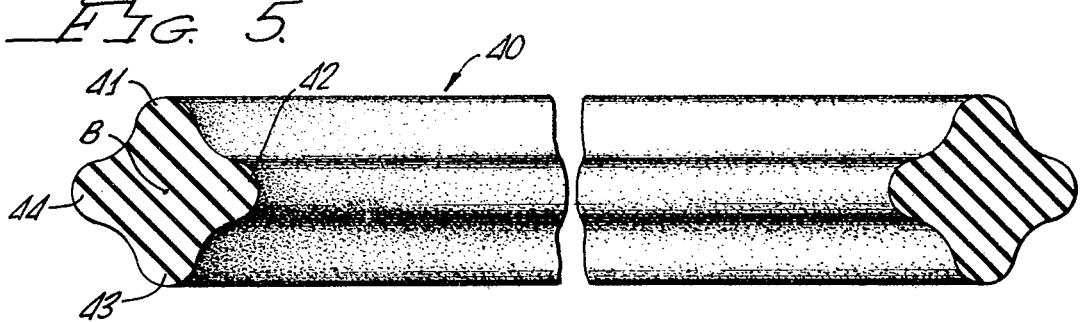
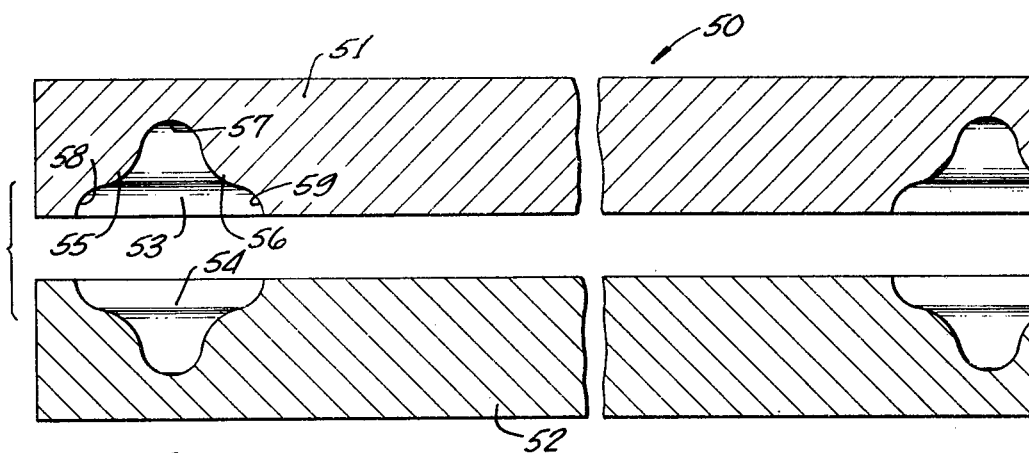
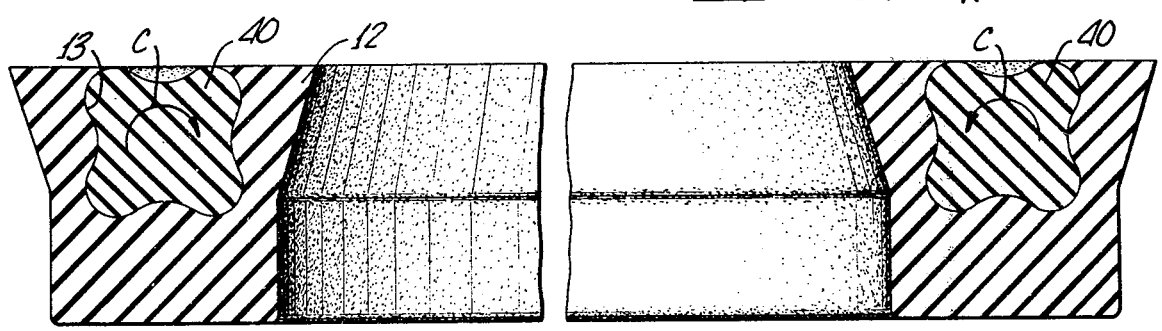

RING SPRING FOR COMPOSITE MACHINERY SEALS AND METHOD OF MANUFACTURING SAME

BACKGROUND OF THE INVENTION

1. Field of the Invention

The present invention relates to a ring spring for composite machinery seals and a method of manufacturing same and, more particularly, to an improved elastomeric resilient ring spring and method of making same for use in an annular elastomeric boot of the U-cup type having an exposed annular groove which is generally x-shaped.

2. Description of the Prior Art

The use of composite machinery seals including a generally annular seal, frequently referred to as a boot or a U-cup, which has an exposed annular groove in one side thereof adapted to receive a resilient ring spring is well known. Commonly, such composite machinery seals are adapted for use with a ring spring which is a conventional O-ring. The primary advantage of a ring spring which is an O-ring is that it is simple and inexpensive to manufacture in a conventional mold.

In order to improve the performance of such a composite machinery seal, it has been proposed to modify the surface defining the annular groove in the U-cup and the shape of the elastomeric resilient ring spring so that both are generally x-shaped. A composite machinery seal with such a configuration is described in U.S. Pat. No. 3,851,888, issued Dec. 3, 1974 and reference should be had to such patent for a discussion of the advantages of such a configuration.

While a composite machinery seal of the configuration described in the before-mentioned U.S. Pat. No. 3,851,888, performs substantially better than a similar composite machinery seal using a conventional O-ring, substantial problems have limited its use. More specifically, the preferred method of manufacturing the ring spring is to mold same using a mold having a cavity which has a cross-sectional shape similar to the groove in the boot. However, it is expensive to manufacture a mold with a cavity of this shape and it is somewhat difficult to eject the ring from the mold after the molding operation. The result has been that it is significantly more expensive to mold a ring spring having a generally x-shape than a ring spring having a generally O-shape. In fact, the manufacturing cost is so much higher that it is competitively impractical to mold such a ring spring.

Therefore, the common approach today is to extrude the ring spring in a continuous length and to subsequently cut strips for use in the boots. While this is substantially less expensive, problems still remain. More specifically, labor costs are now high because the lengths must be individually measured and cut. Furthermore, once a ring spring is inserted into a boot, there is a break in the ring spring and it is common for the ring spring or a portion thereof to come out of the groove in the boot during assembly of the boot into a machine part. An economically practical solution to these problems has been unavailable heretofore.

SUMMARY OF THE INVENTION

According to the present invention, there is disclosed a ring spring and a method of manufacturing same for use in composite machinery seals of the type disclosed in the before-mentioned U.S. Pat. No. 3,851,888 which solves the manufacturing problems encountered heretofore. According to the present invention, a resilient ring spring is manufactured in a mold at a cost which is competitive with the cost of manufacturing conventional O-rings. On the other hand, according to the teachings of the present invention, a ring spring can be manufactured having a shape which, in use, has a generally x-shape.

These objects are achieved by molding a ring spring with a generally +-shape. A mold for manufacturing a ring spring with such a shape is easy to manufacture since it can be manufactured in a single operation. When molding a ring spring of this shape, it is a simple matter to remove the ring spring from the mold. Because, of the elastomeric material from which the ring spring is made, the ring spring rotates easily through an angle of 45° when inserted into the groove in the elastomeric boot so that the finished configuration is the same as utilized heretofore.

Following the teachings of the present invention, it is now financially feasible and practical to use machinery seals of the type described in the before-mentioned U.S. Pat. No. 3,851,888. That is, the ring spring can be molded in one piece at a price competitive with O-rings. Such a ring spring can be installed simply and will not snap out during installation of the boot. There is no cut in the ring spring and the ring spring has all the advantages associated with molded parts over extruded parts.

Still further, a composite machinery seal utilizing the present ring spring has improved spring characteristics over similar composite machinery seals because the torsional force generated upon installation of the ring spring into the groove in the boot increases the sealing force of the seal. The result is a higher lip unit loading which provides better sealing characteristics in use and an increased low pressure sealing effectiveness.

Briefly, and in accordance with the present invention, an elastomeric resilient ring spring for use in an annular elastomeric boot of the U-cup type having an exposed annular groove which is generally x-shaped, the surface defining the annular groove comprising opposed inwardly directed first and second lobes extending into and defining the minimum transverse dimension across the groove, the tips of the first and second lobes being generally aligned with each other, and a third inwardly directed lobe extending from the base of the groove, perpendicular to the first and second lobes, midway therebetween, is formed so that the ring spring is generally +-shaped including four lobes, first and second opposed lobes extending parallel to the plane of the ring spring, third and fourth opposed lobes extending perpendicular to the plane of the ring spring, the dimensions of the ring spring being approximately the same as those of the groove whereby rotation of the ring spring about its ring axis through an angle of 45° permits mating of the ring spring into the groove in the boot. Such a ring spring is molded in a conventional mold having a pair of mold halves, each having an exposed annular mold cavity therein, the surface defining each cavity comprising first and second inwardly directed lobes extending at a 90° angle to each other from the inner corners of the cavity, at 45° angles to the plane of the cavity, whereby the mold forms a ring having a generally +-shape.

OBJECTS, FEATURES, AND ADVANTAGES

It is therefore an object of the present invention to solve the problems associated with manufacturing elastomeric resilient ring springs for use in annular elastomeric boots having an exposed annular groove which is generally x-shaped. It is a feature of the present invention to solve these problems by molding the ring spring with the cross-section rotated 45° from the cross-section required in use. An advantage is to be derived is that the mold required to make the ring spring is substantially simpler to make. A further advantage is that the ring spring can now be made at a price which is competitive with conventional O-rings. A still further advantage is that the ring spring can be installed simply. Another advantage is that the ring spring will not snap out during installation of the seal into a machine part. Still another advantage is that the ring spring has improved spring characteristics. Another advantage is that the ring spring can be molded rather than extruded.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 5 is a cross-sectional view of a ring spring constructed in accordance with the teachings of the present invention;

FIG. 6 is a cross-sectional view of a mold required to make the ring spring of FIG. 5; and FIG. 7 is a cross-sectional view of a composite machinery seal incorporating the boot of FIG. 2 and the ring spring of FIG. 5.

DESCRIPTION OF THE PREFERRED EMBODIMENT

Figure 1:
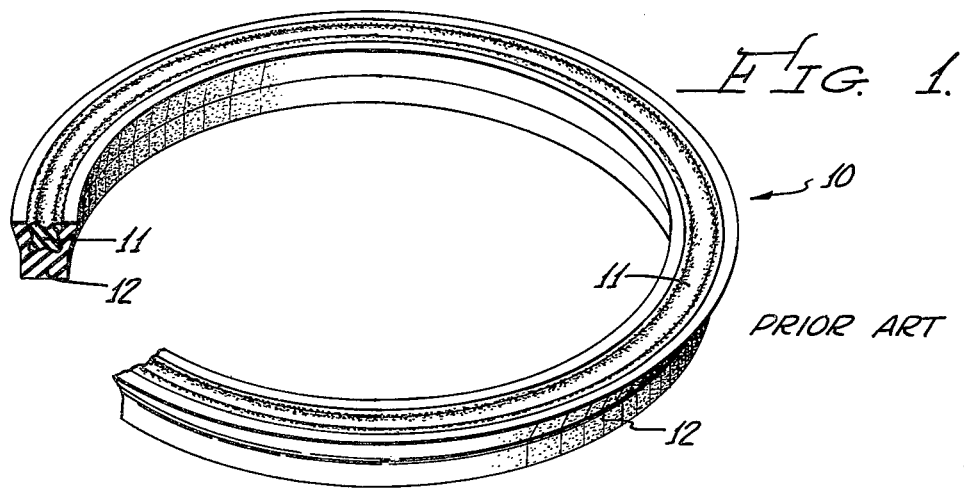
FIG. 1 is a partially broken away, perspective view of a conventional composite machinery seal including a ring spring and a boot constructed in accordance with the prior art.
Figure 2:
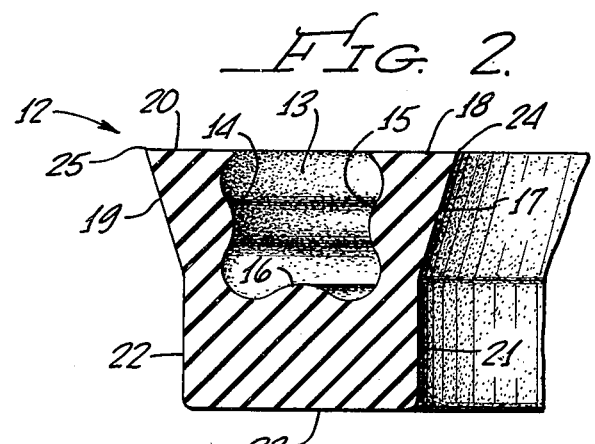
FIG. 2 is a cross-sectional view of the boot of the seal of FIG. 1.
Figure 3:
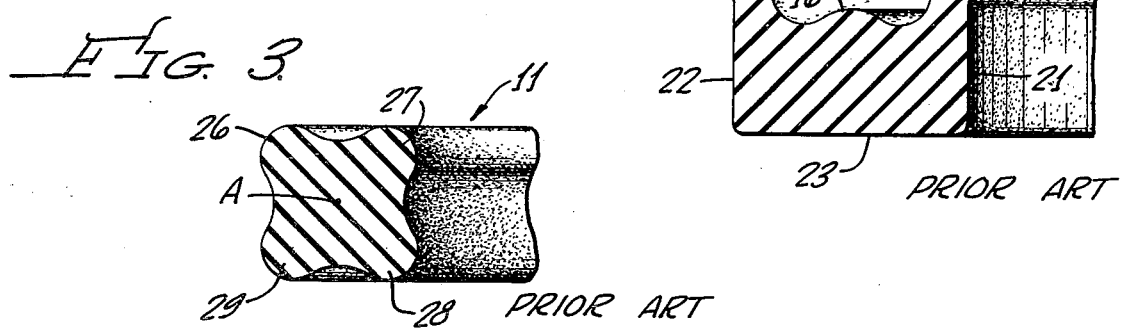
FIG. 3 is a cross-sectional view of the ring spring of the seal of FIG. 1.

Referring now to the drawings and, more particularly, to FIGS. 1, 2, and 3 thereof, there is shown a generally known composite machinery seal, generally designated 10, including an elastomeric resilient ring spring 11 and an elastomeric boot 12, generally of a well-known U-cup configuration. Boot 12 has an axially extending annular groove 13 formed in one side thereof, shown most clearly in FIG. 2. The surface defining groove 13 comprises opposed, inwardly directed, first and second lobes 14 and 15 extending into and defining the minimum transverse dimension across groove 13, the tips of lobes 14 and 15 being generally aligned with each other. The surface defining groove 13 also comprises a third, inwardly directed lobe 16 which extends from the base of groove 13, perpendicular to lobes 14 and 15, midway therebetween.

The external cross-section of boot 12 may be of any of the commonly used shapes presently available. For example, in the area surrounding groove 13, there may be a sloped, radially inward side surface 17, a transverse, radially inward end surface 18, a sloped, radially outward side surface 19, and a transverse, radially outward end surface 20. The area enclosed by surfaces 17–20 is referred to as a bifurcated area and the remainder is a base area bounded by a radially inward planar surface 21, a radially outward planar surface 22, and a base surface 23. The surfaces 17,18 and 19,20 converge at pointed tips 24 and 25, respectively, which contact the machinery in which seal 10 is used, with tip 25 providing the sealing and wiping portion of boot 12.

As shown in FIG. 3, the transverse cross-sectional configuration of ring spring 11 is generally in the shape of a flattened x with four lobes 26, 27, 28, and 29. This shape of resilient ring spring is known in the art and readily available. It is noted that the transverse cross-section of ring spring 11 is made to mate with the transverse cross-section of groove 13. Thus, lobes 26–29 are all positioned at a 45° angle to the plane of ring spring 11, i.e. the plane including the axis "A" thereof.

Figure 4:
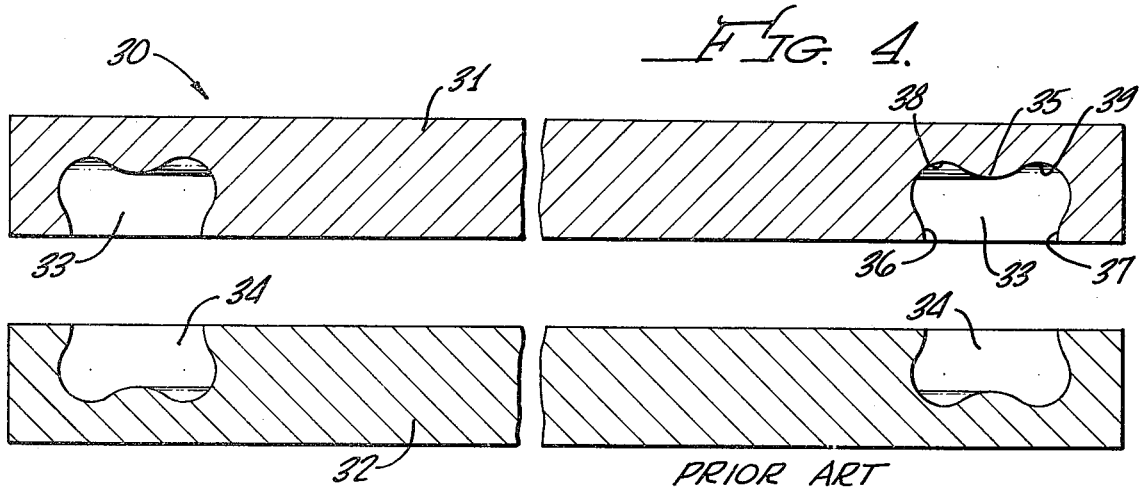
FIG. 4 is a cross-sectional view of a mold of the type required to make the ring spring of FIG. 3.

Referring now to FIG. 4, there is shown a cross-section of a mold, generally designated 30, of the type used heretofore to manufacture ring spring 11. More specifically, mold 30 includes a pair of identical mold halves 31 and 32 having identical annular mold cavities 33 and 34, respectively, therein. Mold cavity 33, for example, has a single inwardly directed lobe 35 extending from the base of cavity 33 and inwardly directed half lobes 36 and 37 extending transversely across cavity 33, at the parting plane of mold 30, so as to define recessed areas 38 and 39 which form two of the lobes of ring spring 11. Because the transverse dimension between lobes 36 and 37 is smaller than the transverse dimension between areas 38 and 39, it is impossible to cut cavity 33 in mold half 31 in a single machining operation. The result is that a complex, multiple operation is required to form cavities 33 and 34 in mold halves 31 and 32, respectively, of mold 30. This has resulted in ring spring 11 being substantially more expensive, when molded, than a conventional O-ring.

Because of these problems in molding ring spring 11, it has become the present practice to extrude ring spring 11. That is, ring spring 11 is commonly extruded in a continuous length and subsequently cut into strips for use in groove 13 in boot 12. However, extruded parts have less favorable characteristics than molded parts and once an extruded ring spring is inserted into boot 12, there is a break in ring spring 11. It is common for ring spring 11 or a portion thereof to come out of groove 13 in boot 12 during assembly of seal 10 into a machine part. The labor cost associated with cutting the extruded ring springs to the right lengths is unacceptably high.

Referring now to FIG. 5, there is shown the transverse cross-sectional configuration of a ring spring, generally designated 40, for use as an alternative to ring spring 11, with boot 12. Ring spring 40 is an elastomeric resilient ring spring made with the same materials and the same general dimensions as ring spring 11. However, ring spring 40 has a generally +-shape with four lobes 41, 42, 43, and 44. Opposed lobes 42 and 44 extend parallel to the plane of ring spring 40, i.e. the plane including the axis "B" thereof. Opposed lobes 41 and 43 extend perpendicular to the plane of ring spring 40. Other than this change in the angular directions of lobes 41–44, ring spring 40 is identical to ring spring 11.

On the other hand, manufacturing ring spring 40 with the cross-sectional shape shown permits ring spring 40 to be molded in a mold, generally designated 50, having the configuration shown in FIG. 6. More specifically, mold 50 includes a pair of identical mold halves 51 and 52, having identical annular mold cavities 53 and 54, respectively, therein. Mold cavity 53, for example, has a pair of inwardly directed lobes 55 and 56 which extend at a 90° angle to each other, from the inner corners of cavity 53, at a 45° angle to the plane of cavity 53, i.e. a plane parallel to the parting plane between mold halves 51 and 52. Lobes 55 and 56 define a single recessed area 57 therebetween, along the base of cavity 53, and recessed areas 58 and 59 which extend transversely across cavity 53.

It should be particularly noted that the transverse dimensions of cavities 53 and 54 continuously decrease from the parting plane between mold halves 51 and 52 to the bases of cavities 53 and 54. As a result, cavities 53 and 54 in mold halves 51 and 52, respectively, can each be cut in a single machining operation so that the cost of manufacturing mold 50 is virtually the same as the cost of manufacturing a mold for a conventional O-ring.

With mold 50, it is a simple operation to mold and eject from the mold ring spring 40. On the other hand, it will certainly be noted that ring spring 40 does not now appear to have a shape which is compatible with the existing groove 13 in boot 12. However, this is not the case. That is, because ring spring 40 is manufactured from an elastomeric material, it is a simple matter to rotate ring 40 around ring axis "B" thereof. Rotation of ring spring 40 around ring axis "B" through an angle of 45° permits mating of ring spring 40 into groove 13 in boot 12, as shown in FIG. 7.

Furthermore, this rotation occurs automatically upon the forcing of ring spring 40 into groove 13. This is, and by way of example, if ring spring 40 is placed on a flat surface and boot 12 is placed thereover, with groove 13 facing ring spring 40, a force on boot 12 towards the flat surface will cause ring spring 40 to simultaneously rotate around axis "B", either in the direction of arrows "C" in FIG. 7 or in the opposite direction, and to snap into groove 13 in boot 12.

A number of advantages flow from manufacturing ring spring 40 with the transverse cross-sectional shape shown. That is, the obvious advantages are that a ring spring can be manufactured in a mold at a cost which is competitive with the cost of manufacturing conventional O-rings. In addition, such a ring spring can be installed simply and it will not snap out during installation of boot 12 into a machine part. There is no longer a cut in ring spring 40 as is the case with extruded ring springs.

What is not immediately as obvious is that a composite machinery seal utilizing ring spring 40 has improved sealing characteristics over similar composite machinery seals. This is because the torsional force generated upon installation of ring spring 40 into groove 13 in boot 12 increases the sealing force of the composite seal. The result is a higher lip unit loading which provides better sealing characteristics in use and an increased low pressure sealing effectiveness.

While the invention has been described with respect to the preferred physical embodiment constructed in accordance therewith, it will be apparent to those skilled in the art that various modifications and improvements may be made without departing from the scope and spirit of the invention. For example, while ring spring 40 has been described as being for use in the groove in a boot of a composite machinery seal, its use is obviously not so limited, it being usable in other seal members or independently of other seal members. Accordingly, it is to be understood that the invention is not to be limited by the specific illustrative embodiment, but only by the scope of the appended claims.

I claim:

1. An elastomeric resilient ring spring for use in an annular elastomeric boot of the U-cup type having an exposed annular groove which is generally x-shaped, the surface defining the annular groove comprising opposed, inwardly directed, first and second lobes extending into and defining the minimum transverse dimension across said groove, the tips of said first and second lobes being generally aligned with each other, and a third inwardly directed lobe extending from the base of said groove, perpendicular to said first and second lobes, midway therebetween, said ring spring being generally +-shaped including four lobes, first and second opposed lobes extending parallel to the plane of said ring spring, third and fourth opposed lobes extending perpendicular to the plane of said ring spring, the dimensions of said ring spring being approximately the same as those of said groove whereby rotation of said ring spring about its axis through an angle of 45° permits mating of said ring spring into said groove in said boot.

2. An elastomeric resilient ring spring for use in an annular elastomeric boot, generally of a U-cup configuration, having an exposed annular groove which is generally x-shaped, said ring spring being generally +-shaped including four lobes, first and second opposed lobes extending parallel to the plane of said ring spring, third and fourth opposed lobes extending perpendicular to the plane of said ring spring.

3. An elastomeric resilient ring member having a generally +-shape including four lobes, first and second opposed lobes extending parallel to the plane of said ring member, third and fourth opposed lobes extending perpendicular to the plane of said ring member.

4. An elastomeric resilient ring member having a generally square cross-sectional shape including four lobes defining the corners thereof, first and second opposed lobes extending parallel to the plane of said ring member, third and fourth opposed lobes extending perpendicular to the plane of said ring member.

5. In a composite seal assembly for machinery comprising an annular elastomeric boot having an exposed annular groove which is generally x-shaped and an elastomeric resilient ring spring received into said annular groove, the improvement wherein the cross-section of said ring spring is generally +-shaped including four lobes, first and second opposed lobes extending parallel to the plane of said ring spring, third and fourth opposed lobes extending perpendicular to the plane of said ring spring, the dimensions of said ring spring being approximately the same as those of said groove whereby rotation of said ring spring about the ring axis thereof through an angle of 45° permits mating of said ring spring into said groove in said boot.

* * * * *